(12) United States Patent
Warakomski et al.

(10) Patent No.: US 12,162,250 B2
(45) Date of Patent: Dec. 10, 2024

(54) HOT FILL LAMINATE

(71) Applicant: KLÖCKNER PENTAPLAST OF AMERICA, INC., Gordonsville, VA (US)

(72) Inventors: Steven J. Warakomski, Gordonsville, VA (US); Rachel Rimeikiene, Culpeper, VA (US); James Warren Davis, Barboursville, VA (US)

(73) Assignee: Klöckner Pentaplast of America, Inc., Gordonsville, VA (US)

( * ) Notice: Subject to any disclaimer, the term of this patent is extended or adjusted under 35 U.S.C. 154(b) by 207 days.

(21) Appl. No.: 16/325,542

(22) PCT Filed: Aug. 15, 2017

(86) PCT No.: PCT/US2017/046910
§ 371 (c)(1),
(2) Date: Feb. 14, 2019

(87) PCT Pub. No.: WO2018/035103
PCT Pub. Date: Feb. 22, 2018

(65) Prior Publication Data
US 2019/0210332 A1   Jul. 11, 2019

Related U.S. Application Data

(60) Provisional application No. 62/375,140, filed on Aug. 15, 2016.

(51) Int. Cl.
*B32B 27/08* (2006.01)
*B32B 3/30* (2006.01)
(Continued)

(52) U.S. Cl.
CPC ............. *B32B 27/08* (2013.01); *B32B 3/30* (2013.01); *B32B 7/12* (2013.01); *B32B 15/085* (2013.01);
(Continued)

(58) Field of Classification Search
CPC ......... B32B 27/08; B32B 27/30; B32B 15/20; B32B 27/327; B32B 27/18; B32B 27/302;
(Continued)

(56) References Cited

U.S. PATENT DOCUMENTS 4,681,723 A   7/1987   Jester
4,883,694 A * 11/1989   Ramalingam .......... C09J 175/04
                                                      428/34.3
(Continued)

FOREIGN PATENT DOCUMENTS

CN   102199338 B   12/2012
CN   205060393 U    3/2016
(Continued)

OTHER PUBLICATIONS

Translation to English for JP 2009-286920 A via espacenet. accessed Apr. 29, 2022 (Year: 2009).*
(Continued)

*Primary Examiner* — Nancy R Johnson
(74) *Attorney, Agent, or Firm* — Christopher G. Darrow; Darrow Mustafa PC

(57) ABSTRACT

A multi-layered film laminate for use in making hot filled blister packages and a method of making such material is provided. The laminate generally includes a central core layer of barrier polymer film disposed between a slip film and a thermostable film. In particularly advantageous embodiments, the barrier film is a polychlorotrifluoroethylene film, the slip film is a polyvinyl chloride film, and the heat resistant film is a temperature resistant copolyester. The
(Continued)

US 12,162,250 B2
Page 2 disclosed material provides a high moisture barrier and a stable inter-laminar structure that can withstand hot filling of liquids, such as liquids used to form soft and/or gummy dosages on form-fill-and-seal blister packaging machines.

22 Claims, 3 Drawing Sheets

(51) Int. Cl.
| | |
|---|---|
| B32B 7/12 | (2006.01) |
| B32B 15/085 | (2006.01) |
| B32B 15/09 | (2006.01) |
| B32B 15/20 | (2006.01) |
| B32B 25/08 | (2006.01) |
| B32B 25/14 | (2006.01) |
| B32B 27/16 | (2006.01) |
| B32B 27/18 | (2006.01) |
| B32B 27/26 | (2006.01) |
| B32B 27/28 | (2006.01) |
| B32B 27/30 | (2006.01) |
| B32B 27/32 | (2006.01) |
| B32B 27/36 | (2006.01) |
| B32B 37/12 | (2006.01) |
| C09J 175/04 | (2006.01) |

(52) U.S. Cl.
CPC .............. *B32B 15/09* (2013.01); *B32B 15/20* (2013.01); *B32B 25/08* (2013.01); *B32B 25/14* (2013.01); *B32B 27/16* (2013.01); *B32B 27/18* (2013.01); *B32B 27/26* (2013.01); *B32B 27/28* (2013.01); *B32B 27/30* (2013.01); *B32B 27/302* (2013.01); *B32B 27/304* (2013.01); *B32B 27/306* (2013.01); *B32B 27/32* (2013.01); *B32B 27/322* (2013.01); *B32B 27/325* (2013.01); *B32B 27/327* (2013.01); *B32B 27/36* (2013.01); *C09J 175/04* (2013.01); *B32B 37/12* (2013.01); *B32B 2250/02* (2013.01); *B32B 2250/03* (2013.01); *B32B 2255/10* (2013.01); *B32B 2264/0235* (2013.01); *B32B 2264/0257* (2013.01); *B32B 2264/0264* (2013.01); *B32B 2264/0292* (2013.01); *B32B 2264/108* (2013.01); *B32B 2264/12* (2013.01); *B32B 2270/00* (2013.01); *B32B 2307/30* (2013.01); *B32B 2307/3065* (2013.01); *B32B 2307/308* (2013.01); *B32B 2307/402* (2013.01); *B32B 2307/406* (2013.01); *B32B 2307/41* (2013.01); *B32B 2307/412* (2013.01); *B32B 2307/718* (2013.01); *B32B 2307/7244* (2013.01); *B32B 2307/7246* (2013.01); *B32B 2307/732* (2013.01); *B32B 2307/734* (2013.01); *B32B 2307/746* (2013.01); *B32B 2327/06* (2013.01); *B32B 2327/12* (2013.01); *B32B 2367/00* (2013.01); *B32B 2439/70* (2013.01); *B32B 2439/80* (2013.01)

(58) Field of Classification Search
CPC ....... B32B 27/32; B32B 27/26; B32B 27/322; B32B 15/09; B32B 27/28; B32B 3/30; B32B 27/306; B32B 25/08; B32B 25/14; B32B 15/085; B32B 27/16; B32B 27/304; B32B 27/325; B32B 7/02; B32B 7/12; B32B 27/36; B32B 2255/10; B32B 2307/3065; B32B 2264/0264; B32B 2307/718; B32B 2264/0235; B32B 2307/30; B32B 2307/746; B32B 2307/732; B32B 2264/0257; B32B 2307/308; B32B 2307/406; B32B 2250/03; B32B 2307/734; B32B 2264/0292; B32B 2250/02; B32B 2270/00; B32B 2307/7244; B32B 2307/402; B32B 2264/12; B32B 2307/41; B32B 2307/412; B32B 2264/108; B32B 37/12; B32B 2307/7246; B32B 2327/06; B32B 2327/12; B32B 2267/00; B32B 2439/70; B32B 2439/80; B32B 7/05; B32B 3/28; B32B 2307/702; B32B 2255/26; C09J 175/04; B65D 75/327; A61J 2205/50; A61J 2205/30; A61J 1/035

See application file for complete search history.

(56) References Cited

U.S. PATENT DOCUMENTS

| | | | |
|---|---|---|---|
| 5,218,049 A | 6/1993 | Yamamoto et al. | |
| 5,532,058 A * | 7/1996 | Rolando | C08G 18/0819 |
| | | | 428/341 |
| 5,686,081 A | 11/1997 | Ono et al. | |
| 5,783,273 A | 7/1998 | Yamamoto et al. | |
| 5,874,035 A | 2/1999 | Tsai et al. | |
| 5,912,070 A | 6/1999 | Miharu et al. | |
| 5,968,663 A | 10/1999 | Muggli | |
| 5,972,445 A * | 10/1999 | Kimura | B32B 27/06 |
| | | | 428/212 |
| 5,991,047 A | 11/1999 | Kohlert et al. | |
| 6,099,682 A | 8/2000 | Krampe et al. | |
| 6,113,927 A | 9/2000 | Hatakeyama | |
| 6,218,024 B1 | 4/2001 | Tamber et al. | |
| 6,306,503 B1 | 10/2001 | Tsai | |
| 6,475,420 B1 | 11/2002 | Numrich et al. | |
| 6,589,642 B1 | 7/2003 | Miller et al. | |
| 6,592,978 B1 | 7/2003 | Miller et al. | |
| 6,749,940 B1 | 6/2004 | Terasaki et al. | |
| 7,000,769 B2 | 2/2006 | Killinger | |
| 7,238,411 B2 | 7/2007 | Yoshida et al. | |
| 7,763,265 B2 | 7/2010 | Buchanan et al. | |
| 7,829,633 B2 | 11/2010 | Heukelbach | |
| 8,541,073 B2 | 9/2013 | Kendig et al. | |
| 8,893,883 B2 | 11/2014 | Valaie et al. | |
| 9,127,122 B2 | 9/2015 | Pearcy et al. | |
| 9,598,519 B2 | 3/2017 | Choi et al. | |
| 9,694,959 B2 | 7/2017 | Priscal et al. | |
| 9,937,099 B2 | 4/2018 | Weikart et al. | |
| 9,962,913 B2 | 5/2018 | Osborn et al. | |
| 10,131,122 B2 | 11/2018 | Sargeant et al. | |
| 10,385,183 B2 | 8/2019 | Maille | |
| 10,618,257 B2 | 4/2020 | Suzuki et al. | |
| 10,639,873 B1 | 5/2020 | Murga et al. | |
| 11,541,646 B2 | 1/2023 | Mitchell et al. | |
| 2002/0104773 A1 | 8/2002 | Kalvelage et al. | |
| 2003/0017326 A1 | 1/2003 | McGurran | |
| 2003/0060589 A1 * | 3/2003 | Shimizu | C08G 18/0823 |
| | | | 528/44 |
| 2003/0099813 A1 | 5/2003 | Bekele | |
| 2003/0188826 A1 | 10/2003 | Miller | |
| 2003/0203141 A1 | 10/2003 | Blum et al. | |
| 2004/0197567 A1 | 10/2004 | Tsai et al. | |
| 2005/0017013 A1 | 1/2005 | Peisach et al. | |
| 2005/0136202 A1 * | 6/2005 | Kendig | B32B 27/34 |
| | | | 428/35.7 |
| 2005/0139505 A1 | 6/2005 | Miller et al. | |
| 2005/0245677 A1 | 11/2005 | Tsukamoto | |
| 2006/0020084 A1 | 1/2006 | Heukelback et al. | |
| 2006/0040076 A1 | 2/2006 | Franzyshen et al. | |
| 2006/0081495 A1 | 4/2006 | Killinger | |
| 2006/0121392 A1 | 6/2006 | Nakatsugawa | |
| 2006/0222845 A1 | 10/2006 | Deng et al. | |
| 2006/0283758 A1 | 12/2006 | Pasbrig | |
| 2006/0287479 A1 * | 12/2006 | Crawford | A01G 9/1438 |
| | | | 528/302 |

(56) References Cited

U.S. PATENT DOCUMENTS

| | | |
|---|---|---|
| 2007/0068842 A1 | 3/2007 | Pasbrig |
| 2007/0212539 A1 | 9/2007 | Yamada et al. |
| 2007/0284280 A1 | 12/2007 | Young |
| 2008/0058495 A1 | 3/2008 | Quillen et al. |
| 2008/0090090 A1* | 4/2008 | Munster ............... C09D 127/08 428/461 |
| 2008/0158490 A1 | 7/2008 | Nakayama et al. |
| 2008/0261050 A1 | 10/2008 | Hartzel et al. |
| 2008/0269701 A1 | 10/2008 | Dircks et al. |
| 2009/0208718 A1 | 8/2009 | Stoll et al. |
| 2009/0227735 A1 | 9/2009 | Shih et al. |
| 2010/0052202 A1 | 3/2010 | Otto et al. |
| 2010/0189942 A1 | 7/2010 | Tamura et al. |
| 2011/0049003 A1 | 3/2011 | Bellamah et al. |
| 2011/0073901 A1 | 3/2011 | Fujita et al. |
| 2011/0210037 A1 | 9/2011 | Muenster et al. |
| 2013/0217830 A1 | 8/2013 | Crawford et al. |
| 2015/0225151 A1* | 8/2015 | Osborn ................. B32B 15/085 604/307 |
| 2015/0353692 A1 | 12/2015 | Bhattacharjee et al. |
| 2019/0129078 A1 | 5/2019 | Won et al. |
| 2019/0366616 A1 | 12/2019 | Berny et al. |
| 2020/0079064 A1 | 3/2020 | Peiffer et al. |
| 2021/0394468 A1 | 12/2021 | Allen et al. |
| 2021/0395446 A1 | 12/2021 | Peters et al. |
| 2022/0106468 A1 | 4/2022 | Wang et al. |
| 2022/0106469 A1 | 4/2022 | Wang et al. |
| 2022/0348715 A1 | 11/2022 | Peters et al. |
| 2022/0363822 A1 | 11/2022 | Peters et al. |
| 2022/0388749 A1 | 12/2022 | Landeghem |

FOREIGN PATENT DOCUMENTS

| | | | | |
|---|---|---|---|---|
| EP | 0239100 | A2 | 9/1987 | |
| EP | 1418042 | A1 | 5/2004 | |
| EP | 1655237 | A1 | 5/2006 | |
| EP | 1709116 | B1 | 10/2006 | |
| EP | 2033775 | A1 | 3/2009 | |
| EP | 2178701 | B1 | 9/2011 | |
| EP | 2365025 | A1 | 9/2011 | |
| EP | 2393658 | B1 | 12/2011 | |
| EP | 2594491 | A1 * | 5/2013 | ............. B29C 65/02 |
| EP | 3152129 | A1 | 4/2017 | |
| EP | 3453734 | A1 | 3/2019 | |
| EP | 3808680 | A1 | 4/2021 | |
| EP | 4011621 | A1 | 6/2022 | |
| JP | S62294548 | A | 12/1987 | |
| JP | S63251234 | A | 10/1988 | |
| JP | H01110953 | A | 4/1989 | |
| JP | H02116546 | A | 5/1990 | |
| JP | 2000255642 | A | 9/2000 | |
| JP | 2002234571 | A | 8/2002 | |
| JP | 2004530164 | A | 9/2004 | |
| JP | 2005199673 | A | 7/2005 | |
| JP | 2005523188 | A | 8/2005 | |
| JP | 2006523581 | A | 10/2006 | |
| JP | 2006313303 | A | 11/2006 | |
| JP | 2007314752 | A | 12/2007 | |
| JP | 2008026881 | A | 2/2008 | |
| JP | 2008030332 | A1 | 2/2008 | |
| JP | 2009513792 | A | 4/2009 | |
| JP | 2009286920 | A * | 12/2009 | |
| JP | 2009545343 | A | 12/2009 | |
| JP | 3140252 | B2 | 3/2011 | |
| JP | 4754181 | B2 | 8/2011 | |
| JP | 2012517359 | A | 8/2012 | |
| JP | 2013503760 | A | 2/2013 | |
| JP | 6745520 | B2 | 7/2015 | |
| JP | 2016020419 | A | 2/2016 | |
| JP | 2019086771 | A | 6/2019 | |
| KR | 100922490 | B1 | 10/2009 | |
| KR | 101495211 | B1 | 2/2015 | |
| KR | 101891351 | B1 | 9/2018 | |
| WO | 2002098959 | A1 | 12/2002 | |
| WO | 2005003235 | A1 | 1/2005 | |
| WO | 2007/001573 | A1 | 1/2007 | |
| WO | 2007104513 | A1 | 9/2007 | |
| WO | 2008014862 | A1 | 2/2008 | |
| WO | 2008033404 | A2 | 3/2008 | |
| WO | WO-2008148176 | A1 * | 12/2008 | ............. B65D 75/36 |
| WO | 2010090893 | A1 | 8/2010 | |
| WO | 2012037087 | A1 | 3/2012 | |
| WO | 2012037180 | A1 | 3/2012 | |
| WO | 2013116445 | A1 | 8/2013 | |
| WO | 2015187174 | A | 12/2015 | |
| WO | 2019089535 | A2 | 5/2019 | |
| WO | 2020076747 | A1 | 4/2020 | |
| WO | 2020076749 | A1 | 4/2020 | |
| WO | 2021080779 | A1 | 4/2021 | |

OTHER PUBLICATIONS

Examination Report for corresponding Indian Patent Application No. 201917006089, filed Feb. 15, 2019.
International Search Report, PCT/US2017/046910, Nov. 24, 2017.
International Search Report and Written Opinion for International Patent Application No. PCT/US2023/013597 mailed on May 19, 2023, 15 pages.
Reichert et al., "Bio-Based Packaging: Materials, Modifications, Industrial Applications and Sustainability", Polymers, [Online] vol. 12, No. 7, Jul. 14, 2020; Retrieved from Internet URL <https://www.ncbi.nlm.nih.gov/pmc/articles/PMC7407213/>; Retrieved on May 15, 2023, 47 pages.
International Search Report and Written Opinion for International Patent Application No. PCT/US2021/059723 mailed on Mar. 24, 2022, 11 pages.
Eastman Product Data Sheet, Developmental Copolyester D41991 Ex-1770-70-20 Natural, no date given, 3 pages.
Eastman Safety Data Sheet, Eastman(TM) Developmental Polymer D41991 Version 1.0, Revision date: Oct. 30, 2020, 10 pages.
Eastman, Eastman Tritan(TM) Copolyester MP100 Product Regulatory Information Sheet, Print Date: Mar. 3, 2021, Version: Mar. 2, 2021 (00,001.00,052), 8 pages.
International Search Report and Written Opinion for International Patent Application No. PCT/US2022/031641, mailed on Aug. 19, 2022, 14 pages.
Topas: "Cyclic Olefin Copolymer (COC)", TOPAS Advances Polymers—Brochure, Jan. 1, 2011, pp. 1-32, Retrieved from the Internet: URL: www.polyplastics.com, [retrieved on Apr. 15, 2019].
www.Topas.Com: "Topas Packaging", Apr. 1, 2011, pp. 1-32, Retrieved from the Internet: URL: https://topas.com/sites/default/files/files/Packaging_E_2014-06.pdf, [retrieved on Nov. 14, 2018].
Topas Advanced Polymers: "TOPAS Packaging", Conference Proceedings Article, Apr. 1, 2011, 32 pages.
International Search Report and Written Opinion for International Patent Application No. PCT/EP2009/007844, mailed on Feb. 17, 2010, 13 pages.
International Search Report and Written Opinion for International Patent Application No. PCT/US10/055498, mailed on Jul. 25, 2011, 6 pages.
International Search Report and Written Opinion for International Application No. PCT/EP2019/063231, mailed on Sep. 18, 2019, 11 pages.

* cited by examiner

HOT FILL LAMINATE

CROSS REFERENCE TO RELATED APPLICATIONS

This application is being filed under 35 U.S.C. § 371 as a National Stage Application of pending International Application No. PCT/US2017/046910 filed Aug. 15, 2017, which claims priority to the following parent application: United States Provisional Application No. 62/375,140, filed Aug. 15, 2016, expired. Both International Application No. PCT/US2017/046910 and U.S. Provisional Application No. 62/375,140 are hereby incorporated by reference herein in their entirety.

FIELD OF THE INVENTION

The present invention relates generally to laminates used for packaging and methods for making such films. The inventive films are particularly useful in blister packaging.

BACKGROUND OF THE INVENTION

Form, fill and seal blister packaging of individual servings or dosages (both of which are referred to hereinafter interchangeably as a "dose") is known in a variety of industries, including the food and medical markets. Blister packaging for foods and pharmaceuticals typically consists of a card-shaped or tray-shaped sheet of polymer containing an array of filled thermoformed blisters onto which a tear susceptible material, such as a foil or a film, has been applied and sealed to the flat portion of the polymer sheet that remains as a sealing-area between the blisters. During thermoforming, the self-supported plastic sheet is heated to a pliable forming-temperature and blisters of a given shape are thermoformed across the sheet width. Blister packaging is particularly popular because it ensures a sterile environment for each dose, keeps multiple doses from sticking together and the same time is esthetically pleasing because it reveals a large part of the dose to the consumer.

Heretofore, pharmaceuticals have arguably provided the broadest applications for blister packaging, due in great part to the stringent dosing requirements and associated higher margins generally commanded by pharmaceuticals. Food applications, although more limited, are known. Chewing gum sold in blister packaging is known, for example. In heretofore known food and pharmaceutical applications, a batch of solid dosages is formed separately, distributed across the face of the thermoformed sheet width via a feed hopper, the solid dosages are subjected to a sweeping motion to place each dosage within an individual blister, and the filled blister array sealed. Such multistep operations, in which solid dosages must be separately formed and swept into individual blisters, greatly increases both the cost and complexity of forming blister packed foods and pharmaceuticals.

In addition, the sweeping action typically used to guide dosages into their respective individual blisters is not conducive for softer solid form dosages, such as gummy dosages, which have a tendency to clump together. Food and chewable medicaments having a soft and/or gummy consistency have grown in popularity over the years and their markets continue to expand. Soft and/or gummy consistency dosages containing medicaments are particularly of interest, as they can be consumed without liquids, for example. Unfortunately, such soft and/or gummy dosages readily stick to one another and are thus difficult to distribute across the surface of the thermoformed polymer sheet and/or to sweep into the individual blisters, as noted above. Soft and/or gummy dosages also require a high moisture barrier to stop the loss of water from the dosage over time, thereby ensuring that the soft and/or gummy dosage remains moist over its entire shelf life, e.g. 2 years or more.

Soft and/or gummy dosages are typically formed by pouring a heated slurry of the dosage into a mold filled with a release agent, cooling the filled mold for an extended period of time, for example 24 hours, releasing the cooled dosage from the mold and tumbling the released dosage in an oil solution to absorb any residual release agent. Rather than solidify the soft and/or gummy consistency dosage, it would be advantageous to fill the thermoformed blisters as a heated slurry. Unfortunately, soft and/or gummy dosage slurries are poured into the mold at an elevated temperature, i.e. a temperature of about 100° C., which is well above the glass transition temperature of conventional blister packaging polymers. This elevated slurry temperature would cause conventional blister packaging polymers, such as PVC, to warp and/or reverse-thermoform. Polymers capable of withstanding higher temperatures are known for applications other than blister packaging; however, such polymers suffer from poor slip characteristics, sticking to tooling, brittleness and the like. Furthermore, thermoforming requires that the laminate layers stretch in unison uniformly to avoid warping, layer fractures and/or cohesive failure, further exacerbating the difficulties associated with providing suitable hot-fillable blister packaging.

Accordingly, a need remains in the art for less complex form, fill and seal blister packaging operations. In addition, there remains a need in the art to produce soft and/or gummy consistency solid dosage forms or hot-filled liquid dosages on form, fill and seal blister packaging equipment.

SUMMARY OF ADVANTAGEOUS EMBODIMENTS OF THE INVENTION

Surprisingly, a polymer laminate structure has been found that imparts a heretofore unknown balance of temperature resistance, ease of thermoforming, low temperature toughness, strength, barrier, cohesion, clarity, and adequate slip, thereby allowing the hot-fill blister packaging of soft and/or gummy dosages. Such a balance is quite unexpected, because the conventional wisdom of those skilled in the art to-date has been that polymers exhibiting a lower glass transition temperature, i.e. low temperature forming materials having less temperature resistance, lead to superior thermoformed products.

Applicants have unexpectedly discovered a multi-layered, cohesive laminate that may be uniformly thermoformed, exhibits adequate barrier properties, does not warp or reverse-thermoform at the elevated temperatures required for the hot-filled blister packaging of soft and/or gummy dosages and exhibits adequate slip. In advantageous embodiments, the central core layer of the laminate is a barrier film, and separate polymer films are disposed on, e.g. adhesively attached to, each of the top and bottom surfaces of the central core layer. A thermostable polymer film is disposed on the top surface of the core layer, and a slip film is disposed on the bottom surface of the core layer. Applicants have further determined that in addition to particular laminate layers, advantageous adhesive systems may also be incorporated between the various film layers that reduce or eliminate interlaminar cohesive failures, particularly fractures at the barrier layer interface, that can arise during thermoforming.

The inventive film laminate, which may also be referred to herein as a "heat resistant laminate", is suitable for use in blister packaging, particularly the blister packaging of soft and/or gummy dosages and especially the blister packaging of soft and/or gummy dosages in a hot, liquid form that subsequently solidifies. The inventive laminates further keep the soft and/or gummy dosages suitably moist over their entire shelf life, e.g. at least 3 months, preferably 6 months, and most preferably 1 or 2 years or more.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

The inventive three-layered, cohesive laminate film generally includes an inner barrier film or layer (also referred to herein as the core layer) disposed between an outer thermostable film or layer bonded to a first surface of the core layer and a slip film or layer bonded to the second, opposing surface of the core layer. In alternative embodiments, the film can also be composed of the thermostable film and slip film layers alone, i.e. without a specific barrier layer, for applications with either a lower shelf life and barrier requirements or if one of either the thermostable layer or the slip providing layer imparts sufficient barrier properties. For ease of discussion, the terms "film" and "layer" may be used interchangeably hereinafter. The term "film" and "layer" is used for layers generated by coating, extrusion, coextrusion, calendering, or any other technology resulting in a solid and continuous layer or a layer exhibiting a repeating pattern.

Figure 1:
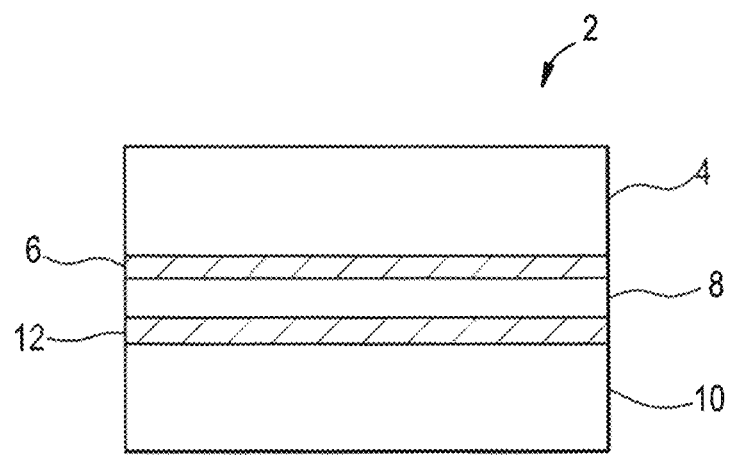
FIG. 1 is a schematic cross-sectional view of an exemplary inventive three-layered laminate.

An exemplary structure of the inventive tri-layered film laminate 2 is schematically depicted in cross-section in FIG. 1. A thermostable film 4 can be attached by means of a first adhesive 6 to one side of the barrier film 8. A slip film 10 is then fixed by means of a second adhesive 12 to the opposing side of the barrier film 8. The first and second adhesives, 6 and 12, may be the same or different. The adhesives 6 and 12, which may differ but are typically the same, are generally a dry bond laminating adhesive which is heat activated and is tacky at room temperature. Further details of the various films and process for forming the inventive multi-layered film laminate 2 are set forth below.

The thermostable film 4 initially comes into direct contact with the dosage in its hot, liquid form. The thermostable film 4 may be any thermoformable, amorphous or semi-crystalline film capable of withstanding the elevated temperatures associated with hot slurries used to form soft and/or gummy dosages, particularly a slurry temperature ranging from about 90 to 110° C., without degrading or warping. Advantageously, the polymers used to form the thermostable film 4 exhibit a glass transition temperature, $T_g$, of at least 90° C., particularly about 90° C. to 185° C., such as about 105 to 140° C. or 110 to 120° C. Accordingly, as used herein, the term "thermostable" (and "heat resistant") generally refers to polymers and resulting films having a $T_g$ of 90° C. or higher. $T_g$ may be measured by any well-known technique, including differential scanning calorimetry ("DSC"), such as a TA DSC 2920 from TA Instruments at a scan rate of 20° C./min. In addition, the thermostable film 4, which is positioned so as to be in contact with the soft and/or gummy dosage, should be selected from an approved Food Contact Material ("FCM") and/or a pharmaceutically acceptable contact material.

Exemplary polymeric films suitable for use as the thermostable film 4 include films formed from any of a number of heat resistant polymers, e.g. heat resistant polyester, cyclic olefin copolymer, high temperature polyethylene, and mixtures thereof, so far as compatible. In especially expedient embodiments, the thermostable film 4 comprises heat resistant polyester incorporating a sufficient amount of 2,2,4,4-tetramethyl-1,3-cyclobutanediol ("TMCD") ((CAS Reg. No. 261716-94-3) monomer to elevate the $T_g$ of the resulting polymer to at least 90° C., as described in U.S. Pat. No. 9,127,122 and United States Patent Application Publication No. 2013/0217830, both of which are hereby incorporated by reference herein. In advantageous embodiments, at least the majority (i.e. greater than 50%), if not the entirety, of the ethylene glycol monomer found in conventional polyester has been replaced by TMCD or other heat resistant or associated monomer. In expedient embodiments, the heat resistant polyester film is formed from polyester that either comprises or consists of dimethyl terephthalate ("DMT"), 2,2,4,4-tetramethyl-1,3-cyclobutanediol ("TMCD"), and one or more of 1,4-cyclohexanedimethanol ("CHDM") and neopentyl glycol. In especially advantageous embodiments, the heat resistant polyester film is formed from polyester comprising less 20 mol % TMCD, resulting in a $T_g$ of from at least 90 to 110° C. Films formed from a polymer comprising dimethyl terephthalate, 1,4-cyclohexanedimethanol and 2,2,4,4-tetramethyl-1,3-cyclobutanediol are commercially available, such as TRITAN™ copolyester film from Eastman Chemical Corporation, Johnson City, Tennessee Suitable heat resistant polyesters from which the 4 film may be formed include exemplary polyesters having a $T_g$ of 105° C.; a $T_g$ of 110° C. and a T of 119° C., and blends thereof.

Further exemplary heat resistant polymer alternatives for forming the thermostable films include various heat resistant or thermostable cyclic olefin copolymer ("COC" or heat-resistant polyethylene ("HT-PE"). Exemplary thermostable COC includes one or more of TOPAS® COC 5013 F-04 (i.e. COC with $T_g$ of 134° C.), TOPAS® COC 6013 F-04 (i.e. COC with $T_g$ of 138° C.) and blends thereof with TOPAS® COC 8007 F-04 (i.e. COC with T of 78° C.). Suitable heat resistant polyethylene includes EXCEED™ 1018HA metallocene polyethylene resin ("HT-PE") having a heat deflection temperature of 130° C., from Topas Advanced Polymers and ExxonMobil, respectively. The instant thermostable films may also be formed from a mixture of heat resistant polymers from differing polymer families, such as a mixture of any or all of the foregoing heat resistant polyesters. COCs and polyethylene or polyolefin. In further beneficial aspects, the heat resistant polymer used to form the thermostable film 4 may include an additional polymer that is incorporated into or blended with the heat resistant polymer to shift the thermoforming window to a more desired range and/or improve ductility in the finished part. The thermostable film 4 may further include effective amounts of any conventional additive known in the art. For example, the thermostable film 4 may include a slip additive, such as silicon dioxide and/or silica gel, release agents to provide a good access to the gummy dosage (dismantle), or any other additive supporting the manufacturing or application. The thermostable film 4 may also include one or more hydrolysis stabilizers, e.g. carbodiimide or the like. In the alternative, the thermostable film 4 may be coated on one or both of its sides with a conventional coating, such as slip coating or adhesion promoting coating.

Exemplary thermostable film 4 thicknesses include any thickness sufficient to withstand the hot dosage filling step while retaining sufficient thermoformability, particularly deep draw applications. Suitable thermostable film 4 thicknesses typically range from around 200 microns to 1200 microns, particularly from 400 to 700 microns, such as 550 microns. The thermostable film 4 is typically the predominant film layer within the laminate, contributing most of the overall laminate thickness. Although not wishing to be bound by theory, Applicants respectfully submit that thicker thermostable films are stiffer and generally exhibit poorer thermoformability, while thinner films of a given polymer are expected to have poorer strength. Consequently, it was quite surprising that a suitable thickness range for the thermostable film 4 could be determined that provides a heretofore unknown balance of thermoformability and adequate hot fill strength. In addition, although the laminate has high temperature resistance during the filling operation, it then exhibits low-temperature toughness if the packages are subsequently used in lyophilized or freeze dried applications. Such a wide range of temperature benefits, i.e. high temperature resistance with low-temperature toughness, was heretofore unknown within conventional blister packaging materials.

The barrier film 8 may be formed from any suitable barrier film known in the art as being well suited for blister packaging. The barrier film 8 is preferably an amorphous or semi-crystalline film. In advantageous embodiments, the barrier film is formed from a fluoro-polymer, such as polychlorotrifluoroethylene ("PCTFE") film, which is commercially available as ACLAR® from Honeywell. In alternative embodiments, fluoro-polymer based films from other manufacturers may also be used. As a further alternative embodiment, a polyvinylidene chloride ("PVDC") product which is commercially available for example as DIOFAN® or IXAN® grade from Solvay, or other suppliers, may be substituted for the fluoro-polymer based film, particularly in applications in which both moisture and oxygen protection are sought. In addition, the PCTFE film may be replaced with an adequately thick layer of cyclic olefin (co)polymer ("COC, COP"); or cyclic olefin (co)polymer or PCTFE combined with an additional layer of poly(ethylene vinyl alcohol) ("EVOH") or a coextruded polyethylene/EVOH/polyethylene for both, oxygen and moisture protection. The barrier layer film 8 may have any thickness sufficient to impart adequate moisture and/or oxygen barrier properties for a given application while retaining thermoformability. In alternative embodiments, the barrier layer may be omitted from the inventive heat resistant laminates, i.e. the inventive laminates have a two-layered film structure incorporating a thermostable film and a slip film bonded via adhesive as described herein.

Exemplary barrier film 8 thickness ranges from approximately about 7 to 300 microns, particularly from about 10 to 240 microns. Exemplary barrier film thicknesses for various polymeric films range from about 15 to 152 microns fir a PCTFE film, preferably 15 to 51 microns, from about 7 to 150 microns (i.e. a dry weight per unit area of 12 $g/m^2$ to 240 $g/m^2$) for a PVDC film, preferably 18 micron to 72 micron (i.e. a weight per unit area of 30 $g/m^2$ to 120 $g/m^2$); and 50 to 300 microns for a COC or COP film. The barrier film 8 typically contributes only a minor portion of the overall laminate thickness.

The slip film 10, which is not in contact with the dosage, may be formed from any suitable polymer or combination thereof known in the art to impart slip within blister packaging. The slip film 10 is preferably formed from polyvinylchloride ("PVC") polymer, but the slip film 10 may be formed from other polymers including, but not limited to, polyethylene terephthalate-1,4-cyclohexane 2 methyl ester ("PETG"), rubber modified nitrile polymer, polypropylene ("PP"), polyethylene ("PE"), polystyrene ("PS"), impact modified acrylonitrile methyl acrylate copolymer (commercially available as BAREX®) or PVDC, each of which may optionally further include a slip-coating. The foregoing alternatives each has different desirable properties. For example, where gamma sterilization is required, such as in the medical device industry, a PETG film can be used since PVC cannot be so sterilized without being degraded and yellowed. If an additional oxygen barrier is required, a rubber modified nitrile polymer film can be employed since it provides an additional oxygen barrier to the product along with the moisture barrier otherwise provided by the barrier film 8. In some cases, a halogen-free contact surface is required. In these instances, the use of polypropylene or polystyrene is appropriate. In addition to the primary film forming polymer, the slip film 10 may contain any additive known in the art of slip films, such as any additive known in the art of PVC film. Such additives are present in effective amounts known to those skilled in the art. Exemplary additives include impact modifiers, such as methyl methacrylate-butadiene-sytrene acrylic copolymer, one or more of dioctyltin his (2-ethylhexyl thioglycolate), octyl tris (2-ethylhexyl thioglycolate), dioctyltin mercaptoacetate, methyl-tin and/or dimethyl-tin blend to impart heat stability, PVC copolymers such as vinylchloride-vinylacetate copolymers, blends with other polymers like PVC/PETG blends, lubricants such as one or more of fatty acid esters, fatty alcohols and fatty acids; pigments, such as black pigment, particularly carbon black, and violet pigment, particularly solvent violet 13. PVDC films are usually applied as a coating from an aqueous dispersion, although not limited to such application. In case of the use of a PVDC film as the slip film 10, the outermost layer ("top coat") of the PVDC can be modified by using a slip additive like particles of high density polyethylene ("HDPE"), low density polyethylene ("LDPE"), linear low density polyethylene ("LLDPE"), polypropylene, polyamides, polyurethanes, acrylonitrile butadiene styrene polymerizates, polytetraflouroethyelene ("PTFE"), hard waxes, as well as mixtures and copolymerizates thereof (thereby forming a "slip-coated film" or "slip-modified film") as described in U.S. Pat. No. 8,986,826, hereby incorporated by reference herein. For ease of discussion, the term "slip film" as used herein includes not only an uncoated film formed from the foregoing polymers (e.g. a film filled with inert particles or the like), but also the slip-coating (e.g. a coating containing slip additive) and/or the resulting slip-coated film (e.g. a PVDC film with an outermost PVDC slip-coating). In particularly expedient embodiments, the inventive temperature resistant laminates may be formed from a thermostable film and slip-modified barrier film, such as a thermostable film and a PVDC film with an outermost PVDC slip-coating or the like.

Exemplary slip film 10 thicknesses include any thickness sufficient to impart suitable slip properties in blister packaging, particularly deep draw applications. The slip film 10 is preferably approximately 4 microns to 120 microns in total thickness, although different total thicknesses in the range of approximately 40 to 80 microns, particularly 60 microns for a PVC film and 5 microns for a slip modified PVDC film may be used.

First and second adhesives, 6 and 12, which may be independently selected, can be any suitable adhesive known in the art to adhere barrier films, such as PCTFE films, to additional polymeric films within blister packaging. One or both of the adhesives 6 and 12 are preferably a one or two component polyurethane (PUR) adhesive, particularly a two-component water based polyurethane dry-bond laminating adhesive. Exemplary polyurethanes suitable for incorporation include polyester-, polyether- and polycaprolactone-based polyurethanes. Suitable polyurethanes may further be either an aromatic or an aliphatic PUR. Adhesives are commercially available from a number of suppliers, including Henkel, Dow Chemical and BASF. The adhesives 6 and 12 can be water-dilutable polyurethane adhesive using isocyanate, epoxy, carbodiimide, or other cross-linking chemistry or no crosslinking component to achieve a bonding between each of polymer films 4, 8 and 10. In advantageous embodiments, the use of isocyanate-hydroxy or epoxy-amine crosslinked PUR systems resulted in an excellent bond between each of the polymer films 4, 8 and 10, thereby ensuring excellent cohesion within the resulting film laminate 2. In expedient aspects, amino-functionalized PUR can be crosslinked with an epoxy crosslinker, while hydroxy-functionalized PUR can be crosslinked with isocyanate based crosslinkers.

In alternative embodiments, solvent based adhesives or solvent free (100% solids) adhesives, such as PUR/isocyanate based adhesives, may be used as one or more of adhesives 6 and 12. In that regard, solvent based or 100% solids may impart superior adhesion in comparison to water based adhesives. In further alternative embodiments acrylate adhesives, vinylacetate and ethylene-vinylacetate copolymers, particularly as hotmelt adhesives, may be used as the first and/or second adhesives, either alone or in addition to PUR adhesives.

Figure 2:
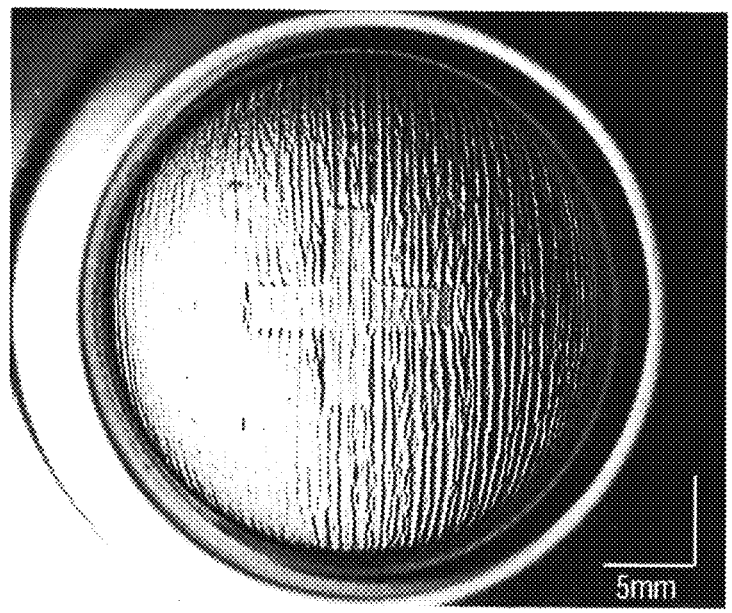
FIG. 2 is an enlarged photograph of an exemplary blister exhibiting striations and fractures in the barrier layer.
Figure 3:
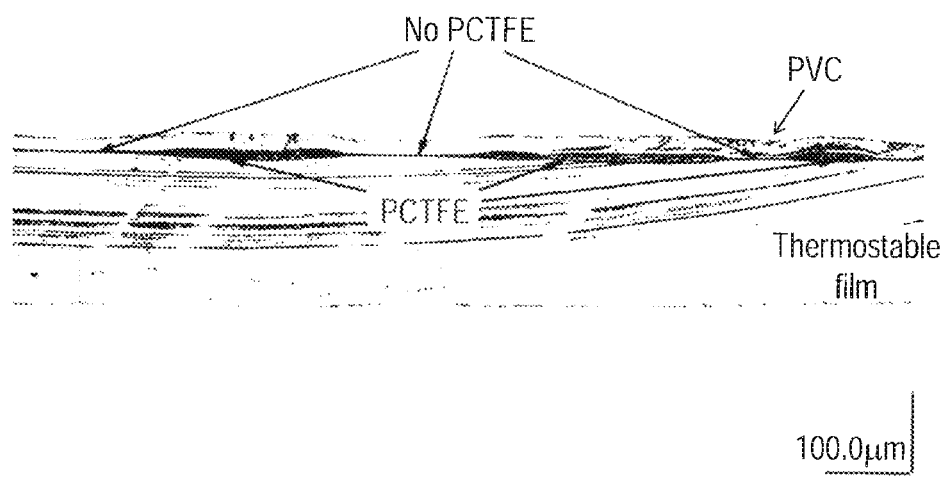
FIG. 3 is a picture from a digital optical microscope of a cross-section of an exemplary blister exhibiting striations.
Figure 4:
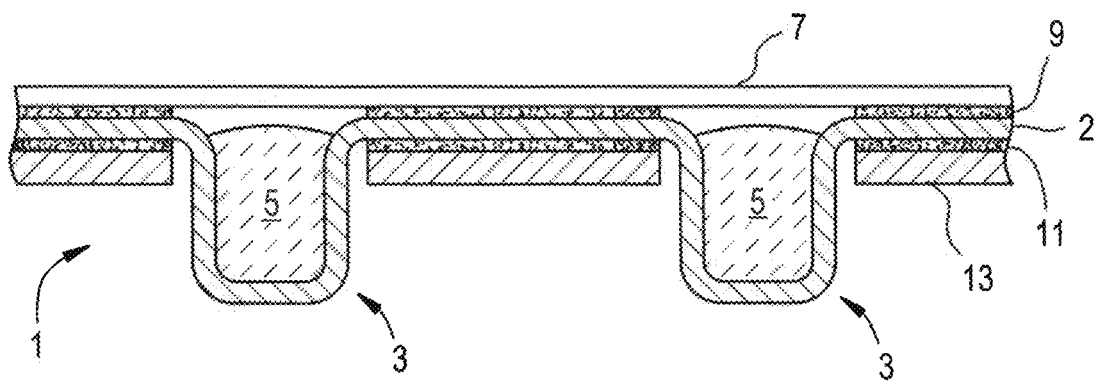
FIG. 4 is a schematic cross-sectional view of an exemplary blister package incorporating the inventive three-layered laminate.

Inventive laminates incorporating crosslinked first and/or second adhesives generally have improved mechanical and climate stability in comparison to inventive laminates whose first and/or second adhesives do not include crosslinker. Furthermore, an effect referred to as "striations" has been observed during blister formation for laminates incorporating specific barrier layers, and particularly in embodiments in which the barrier layer is PCTFE. These striations, imparted during blister thermoforming, are intermittent thicker and thinner areas or regions of polymer within the film layer (such as the barrier layer) that give rise to a striped or striated appearance in the resulting laminate, as illustrated in FIG. 2. Minimal or moderate striations, such as striations barely visible to the naked eye, are of little or no consequence relative to laminate performance. In extreme cases, however, the striations are alternating stripes of (i) polymer and (ii) missing or extremely thin polymer within the layer, giving rise to longitudinal fractures in the affected layer, as illustrated in FIG. 4. Fractures occurring in the barrier layer 8 can increase the transmission rates, for example by a factor of 3 or more, which has serious negative effect on the product stability and protection.

Surprisingly, by using a crosslinked adhesive as the first and/or second adhesive, for example by incorporating isocyanate or epoxy crosslinking agent within polyurethane for the first and/or second adhesive, the striation effect can be avoided or at least considerably mitigated such that the striations are of little or no consequence relative to laminate performance. Exemplary amounts of crosslinking agent that may be used within the first and/or second adhesive to diminish or remove the foregoing striations range from range from 1 to 15%, based on the weight of crosslinker solids/adhesive layer solids, such as from 5 to 15%, based on the weight of crosslinker solids/adhesive layer solids. The amount of crosslinker incorporated into the first and/or second adhesives can be tailored to impart the desired shelf life for a given product, with higher amounts of crosslinker generally expected to impart longer shelf life, up to the point at which the crosslinker loading has effectively eliminated the striation effect.

Adhesives 6 and 12 are generally applied as a coating, particularly an aqueous coating. The adhesive coating may be applied by any coating method known in the art, including gravure coating, doctor blade coating and the like. Exemplary coating weights for adhesives 6 and 12 include any coating weight sufficient to impart adequate interlaminar cohesion within barrier-containing blister packaging, such as PCTFE blister packaging, particularly deep draw applications. The adhesives 6 and 12 typically have a dry coating weight ranging from 1.5 to 14 grams per square meter, such as from 3 to 7 grains per square meter, although different coating weights may be used. The first 31) adhesive and second adhesives 6, 12 typically impart bond strength between their respective layers (i.e. between the thermostable film and the barrier film for the first adhesive and between the barrier film and the slip film for the second adhesive) ranging from about 7 N/15 mm to about 11 N/15 mm, such as from about 8 N/15 mm to about 10 N/15 mm.

In particularly advantageous embodiments, the laminate 2 includes heat resistant polyester film as the thermostable film 4; PVC film as slip film 10; PCTFE film as the barrier film 8 forming the core layer, and cross-linked polyurethane dry-bond laminating adhesive as both adhesive layers 6 and 12. Further alternative exemplary embodiments include the laminate constructions: polyester/PVDC/PVC; polyester/slip modified PVDC; polyester/COC/PVC; polyester/COC/PP; COC/PCTFE/PVC; COC/PCTFE/PP; HT-PE/PCTFE/PVC; HT-PE/PVDC/PVC; HT-PE/slip modified PVDC; HT-PE/COC/PVC; and HT-PE/COC/PP; while barrier-free exemplary embodiments include polyester/PVC; polyester/GPET; COC/PVC; COC/PP; HT-PE/PVC; HT-PE/GPET (in which the various film layers of the foregoing laminates are delineated via a backslash).

Exemplary laminate 2 thicknesses range from about 300 to 1200 microns, preferably from 450 to 1000 microns, and most preferably 500 to 700 microns.

The multi-layered film laminate 2 may have a high gloss, be transparent, or be colored or opaque, as desired. The laminate 2 is presented as a sheet-like material which may be stored and transported as a roll. A master roll of laminate 2 when mass-produced has a typical width which may be between 1000 and 1600 millimeters and a typical length which may be between 1000 and 2500 meters. Master rolls may be converted to smaller slit rolls that may be typically produced in widths from 80 to 600 millimeters and lengths from 200 to 2500 meters.

Inventive multi-layered film laminates 2 typically exhibit a moisture vapor transmission rate ("MVTR" at 38° C., 90% RH ranging from about 0.04 $g/m^2$ day to 3 $g/m^2/day$, particularly about 0.38 $g/m^2/day$, as determined via ASTM F1249-13 inter alia. Inventive multi-layered film laminates 2 typically exhibit an oxygen transmission rate ("OTR") at 23° C. 50% RH ranging from about 0.3 cm$^3$/m$^2$/bar/day to 24 cm$^3$/m$^2$/bar/day, particularly about 11.5 cm$^3$/m$^2$/bar/day, as determined via ASTM F2622 inter alia. Inventive multi-layered film laminates 2 typically exhibit a UV transmission at 340 nm ranging from about 32% to 80%, particularly about 65%. The multi-layered film laminate is typically cured at ambient conditions, e.g. at about 23° C. and 50% RH, such as a period of about 24 hours to 150 hours or more, to adequately cure and/or set the first and second adhesive. The multi-layered film laminate, and its component films, are typically amorphous, having a crystallinity of less than about 35%, as is known in the art. The inventive laminates further exhibit adequate slip characteristics, do not sticking to tooling, and are not brittle. The inventive laminates provide for the production of soft and/or gummy consistency solid dosage forms or hot-filled liquid dosages on conventional form, fill and seal blister packaging equipment, e.g. the inventive laminates exhibit adequate dimensional stability and heat resistance to avoid warping and/or reverse-thermoform during hot-filling. The inventive laminates further impart a shelf life of over 3 to 6 months, preferably over 1 year and most preferably over 2 years, to the blister packaging contents.

The process of creating laminate 2 generally involves two separate laminating steps or operations. The first operation begins with unwinding the thermostable film 4 from a motor-driven winder. Motor driven winders are located on the unwind and rewind to control the speed of the material through the machine. Load cells are located throughout the machine to control and isolate the tension of the material throughout the process. After the thermostable film 4 is unwound, the thermostable film 4 passes through a surface treatment on at least a first surface to increase the surface tension of the thermostable film 4. Exemplary surface treatments include any surface treatment known in the art to increase the surface tension of the thermostable film 4 sufficiently for coatings, particularly to impart a surface tension of greater than about 40 dyne/cm. Advantageously, at least a first surface of the thermostable film 4 is treated via a corona treater, which increases the dyne level of the thermostable film to approximately 50 dyne/cm. As known in the art, surface treatment activates the surface of the thermostable film, to allow for better bonding or adhesion of the adhesive to the treated surface. After surface treatment, the adhesive 6 is applied to the surface of the thermostable film 4 that has been treated. The adhesive 6, which may be applied by any suitable coating technique known in the art, is typically applied by a reverse gravure coating method. Reverse gravure coating, which is well known to those skilled in the art, applies the adhesive 6 using an engraved roll rotating in the reverse or opposite direction relative to the thermostable film 4. The adhesive is metered to a precise quantity onto the coating cylinder by a metal or polymer doctor blade, and the engraved coating cylinder then transfers the adhesive 6 onto the treated surface of the thermostable film 4. The coating cylinder typically rotates at a speed between 90 to 150% of line-speed, although other rotation speeds may be used. The machine line-speed generally ranges between 50 m/min and 200 m/min, although higher or lower machine line-speeds may be used. After the adhesive 6 is applied to the thermostable film 4, the adhesive coated thermostable film 4 is subsequently transported into a vertical dryer.

The vertical dryer uses forced air convection through slotted nozzles to remove the moisture from the adhesive and exhaust the moisture into the atmosphere. The drying air is generally heated to anywhere between 50 to 150° C., although any temperature known in the art as suitable to dry the adhesive may be used. After leaving the dryer, the thermostable film 4 with dried adhesive is laminated directly to the barrier film 8 by a hot nip. The hot nip uses a heated roll, such as a chrome roll, and a rubber roll to bond the thermostable film 4 and barrier film 8 together. The thermostable film 4 and the barrier-film 8 web are transported into the nip from a motor driven or non-driven but braked unwind. Prior to lamination, the surface of the barrier film 8 to be bonded to the thermostable film 4 is likewise subjected to a surface treatment to over 40 dyne/cm. Advantageously, the surface of the barrier film 8 to be bonded to the thermostable film 4 is surface treated via a corona treater, which increases the dyne level of the barrier film 8 to approximately 50 dyne/cm. As known in the art, surface treatment activates the surface of the barrier film 8, to allow for better bonding or adhesion of the adhesive on the thermostable film 4 surface to the treated barrier film 8 surface. In that regard, it is the surface treated barrier film surface that is bonded to the adhesive coated surface of the thermostable film in the hot nip laminator. After the intermediate heat-resistant-film/barrier-film laminate structure leaves the hot nip laminator it is rewound into a roll by a motor driven rewind.

The second bonding operation is almost identical to the first with a few exceptions. The machine is operating under the same conditions as in the first operation. However, instead of thermostable film 4 being used as the original substrate on the primary unwind, the thermostable film/barrier film intermediate laminate is placed on the primary unwind and the slip film 10 is placed on the laminating unwind. The remainder of the process is the same as the above description. An adhesive is applied directly to the barrier film side of the heat-resistant-film/barrier-film intermediate laminate after the remaining barrier film 8 surface has been surface treated to over 40 dyne/cm. Advantageously, the surface of the barrier film 8 to be bonded to the thermostable film 4 is surface treated via a corona treater, which increases the dyne level of the PCTFE to approximately 50 dyne/cm. The adhesive coated heat-resistant film/barrier film intermediate laminate is dried using the conditions noted above. The slip film 10 on the laminating unwind is also surface treated to over 40 dyne/cm, such as corona treated to about 50 dyne/cm. The surface treated surface of the slip film 10 is then laminated directly to the adhesive coated barrier side of the heat-resistant-film/barrier-film intermediate laminate. The resulting three layer laminated material is then rewound onto a core. The three layered laminate 2 generally further cures on the roll at ambient conditions, e.g. a cure time of about 150 hours at about 23° C., 1 atm and 50% relative humidity, prior to further processing like slitting in customer reels with the right length and width. The reels may be shipped after appropriate packaging to the customer An alternative, during the second laminating operation, instead of the two-layer thermostable film/barrier film intermediate laminate being placed on the primary unwind, it is instead placed on the laminating unwind. Furthermore, instead of the slip film 10 being placed on the laminating unwind, the slip film 10 is instead placed on the primary unwind. The rest of the process is the same as in the second operation for the first method, described above. The adhesive is applied directly to the slip film 10 after the slip film 10 is surface treated, such as corona treated to about 50 dyne/cm. The surface treated surface of the barrier film side of the thermostable film/barrier film intermediate laminate is then laminated directly to the slip film 10 to create the slip film/barrier film/thermostable film structure. This alternative method of applying the adhesive to the slip film 10 rather than to the exposed barrier surface of the film/barrier film intermediate laminate may result in a product with higher interlaminar strength between the film layers. The resulting three layer laminated material may then be wound onto a winder and shipped or used for further processing to make blister packages as described above.

Table I presents an exemplary range of technical specifications for multi-layered film laminate 2 in the case where PVC is used as the slip film 10; PCTFE is used as the barrier film 8, and heat resistant copolyester is used as the thermostable film 4.

TABLE I

| Properties | Standard | Metric Unit | Value |
|---|---|---|---|
| Total Thickness | TM-66 | μm | 633 +/− 6% |
| Heat Resistant Copolyester Thickness | TM-66 | μm | 550 +/− 5% |
| PCTFE Thickness | TM-66 | μm | 15.24 +/− 15% |
| PVC Thickness | TM-66 | μm | 60 +/− 10% |
| Yield (Coverage) | TM-51 | m$^2$/kg | 1.29 |
| MVTR (38° C., 90% RH) | F-1249 | g/m$^2$/day | 0.38 |
| OTR (23° C., 50% RH) | D-3985 | cm$^3$/m$^2$/bar/day | 11.5 |
| UV transmission (340 nm) | TM-97 | % | 65 |

For a more detailed understanding of the invention, reference is now made to FIG. 4 of the drawings. This figure illustrates a cross-sectional view of a blister package 1 having a multilayered film laminate 2 which is preferably thermoformed into a shape including protrusions 3 (which may also be referred to as "blisters") into which a hot, liquid dosage 5 is inserted prior to sealing of the package with a lidding layer 7 (which is also commonly referred to in the art as "lidding stock"), such as an aluminum foil layer. A third adhesive layer 9 may be used to attach the multilayered film laminate 2 to the lidding layer 7. A fourth adhesive layer 11 may be used to attach a printed PVC card 13 to a second opposing side of the multilayered film laminate 2. Adhesive layers 9 and 11 are typically heat seal coatings which are activated by heat but are not tacky at room temperature. The printed PVC card 13 may be printed with important product information and/or graphics as desired by the end user.

The inventive multilayered film laminate 2 may be formed and filled with liquid dosages in-line using form fill and seal blister packaging machines known in the art. The inventive multilayered film laminate 2 allows for the in-line form/fill/sealing of a hot liquid dosage on a single of equipment that produces unit dose packaging instead of the production of dosage batches and subsequent filling step. Such form, fill and seal machines initially form the protrusions, e.g. via a deep draw step employing draw ratios of 3 or more, from laminate 2 supplied on a roll. The liquid dosages, e.g. hot slurries from which soft and/or gummy dosages are formed, are subsequently injected or otherwise delivered into the individual protrusions within a very short time. e.g. a few seconds or a traction of a second, after the protrusion or blister has been formed. The liquid dosages injected into the individual protrusions typically have a temperature of about 90 to 100° C., and a weight ranging from about 2.5 to 7 g/protrusion, such as about 5 g/protrusion. The sealing layer is then applied in-line, ensuring sterile packaging of the dosage. The packaging machine further coverts the laminates from roll form into individual blister packages, as known in the art. Form fill and seal blister packaging machines are commercially available from a number of suppliers, including Uhlmann Packaging Systems.

As noted above, several blisters produced early in the investigation were noted to suffer from severe striations, shown as jagged, dark black lines in FIG. 2 that are clearly visible to the naked eye. Such striations could arise through improper selection of materials or processing conditions, and evidence indicates that they are imparted by the barrier layer. The striation effect may be intensified by elevated deep draw ratios during blister formation. The term "deep draw ratio" refers to the thinning of the original laminate thickness during blister thermoforming, and shall be understood within this document as the ratio of the total thickness of the film in the thinnest part of the formed cavity (which is typically the cavity bottom) and the original thickness of the unformed film sheet. Blister deep draw ratios ranging from 1:1 to 2.5:1 do not generally give rise to striations, while with moderate blister deep draw ratios ranging from over 2.5:1 to 3.5:1 striations are possible, and for elevated deep draw ratios ranging from over 3.5:1 to 6.5:1 striations are highly probable an clearly observable. The blister shown in FIG. 2 had a deep draw ratio of 3.8:1. Deep draw ratios can be determined from a cross section, such as formed using a razor blade or microtome, and measurement of the laminate and final blister thicknesses with a microscope that is calibrated on a mechanical length reference (e.g. a Keyence VHX-2000) on the prepared edges of the laminate and blister cross-section, respectively. Alternatively, deep draw ratios can be determined via DIN 53370:2006-11. As noted above, evidence indicates that these striations could be formed from thin or missing polymer in the barrier layer. Such thin or missing barrier layer is generally evidenced by an elevated water transmission rate, such as a water transmission rate of about 2.39 mg/(cavity, day)+/−0.12 mg/(cavity, day) or higher, which would be expected to translate into a product shelf life of about 4 months or less. Such shelf life is unacceptable for many blister packaged products. Applicants then determined that the foregoing laminate striations may be addressed by choosing the appropriate adhesive and admixing a suitable amount of crosslinking agent into the laminate adhesive(s).

The liquid dosages 5 may be any liquid slurry or liquid preparation known in the food and/or medicinal arts, including liquid slurries or liquid preparations used to form solid dosages having a soft and/or gummy consistency. Suitable soft or solid dosages 5 may be formed from compositions predominantly comprised of gelatin, gum Arabic or the like. The dosages may be purely confectionary, such as gum drops or the like, or may include medicaments, such as vitamins or nutraceuticals. The protrusions may have any shape, such as an elongated dome shape, with the solidified soft and/or gummy dosage taking on the shape of the protrusion as it cools. The inventive multilayered film laminates allow the in-line blister packaging of soft and/or gummy dosages and provide a shelf life for the same of at least 3 to 6 months, up to about 1 to 2 years or more.

In further beneficial aspects, the liquid dosages 5 do not harden into a solid or gummy consistency, but instead remain as a solution or dispersion, with the inventive blister packaging thus serving as an ampule. The sterile liquid dosage 5 could subsequently be administered via either subcutaneous, intramuscular, or intravenous injection. Alternatively, the liquid dosage 5 could be applied to the patient's skin or consumed directly from the blister by a patient or consumer. In further beneficial embodiments, the liquid dosages 5 may thicken over time to exhibit a jelly, gel-like or syrup consistency. The inventive multilayered film laminates allow the in-line blister packaging of liquid dosages and likewise provide a shelf life for the same of at least 3 to 6 months, and up to about 1 to 2 years.

Example 1

An exemplary inventive multi-layered film laminate was formed by laminating a 550 μm thick heat resistant copolyester to the first surface of a 15.24 μm thick PCTFE film via an amino-functionalized PUR applied at a coating weight of 4.5 g/m². The PUR adhesive contained 12.8 wt % (solid/solid) of an epoxy crosslinker. A 60 μm PVC film was subsequently laminated to the second surface of the PCTFE film via a PUR adhesive also applied at a coating weight of 4.5 g/m² and likewise containing 12.8 wt % of an epoxy crosslinker. All bonding surfaces were corona treated to greater than about 40 dyne/cm prior to PUR adhesive application. Both the intermediate heat-resistant-copolyester/PCTFE laminate structure and the final three layered laminate structure were laminated in a hot nip laminator. The final laminate was allowed to rest for about 150 hours at about 23° C., 1 atm and 50% relative humidity. The laminates were then formed into a blister cavity, a set of 8 blister cavities were filled with a desiccant on silica gel basis and sealed. The filled blister cavities were stored at 40° C. and 75% relative humidity, weighed daily for several days. The transmission rate was then calculated from the slope in the linear part of the curve of the time-weight-diagram.

Figure 5:
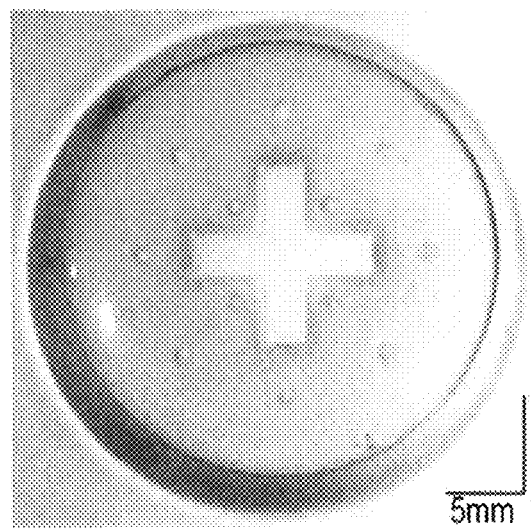
FIG. 5 is an enlarged photograph of an exemplary blister formed from laminate in accordance with Example 1.

As shown in FIG. 5. Example 1 does not exhibit striations, or if present they are minimal, i.e. the striations are substantially invisible to the naked eye, although the deep draw ratio in this example was 3.9:1, i.e. an elevated draw ratio for the forming window.

Example 1 had a water transmission rate of about 0.84 mg/(cavity, day)+/-0.04 mg/(cavity, day), which would be expected to provide a product shelf like of about 1 year, a normal expiry period for conventional food and pharmaceutical goods. The elevated product shelf life in Example 1 indicates that barrier layer fractures either did not occur at all or occurred only to a minor extent.

Additional advantages, features and modifications will readily occur to those skilled in the art. Therefore, the invention in its broader aspects is not limited to the specific details, and representative devices and structures, shown and described herein. Accordingly, various modifications may be made without departing from the spirit or scope of the general inventive concept as defined herein or its equivalents.

As used herein and in the following claims, articles such as "the", "a" and "an" can connote the singular or plural.

All "%" are weight percentages, unless indicated to the contrary or otherwise obvious from the context. Also, ranges disclosed herein include not only the enumerated end points, but also all integers and fractions subsumed therein to at least the hundredth place.

Additionally, features(s) and/or element(s) from any embodiment may be used singly or in combination with other embodiment(s). Therefore, it will be understood that the appended claims are intended to cover all such modifications and embodiments, which come within the spirit and scope of the present invention.

That which is claimed:

1. Blister packaging comprising:
one or more blisters formed from a hot liquid dosage fillable multi-layered film laminate comprising a barrier film disposed between a thermostable film and a slip film, said barrier film is adhered to said thermostable film via a first adhesive layer and said barrier film is adhered to said slip film via a second adhesive layer,
wherein the first and second adhesive layers comprise at least one polyurethane independently selected from a polyester-based polyurethane, a polyether-based polyurethane, and a polycaprolactone-based polyurethane,
wherein at least one polyurethane is crosslinked with an isocyanate or an epoxy crosslinker, and
wherein the film laminate comprises one or more blisters comprising an inner surface defined by the thermostable film, and
wherein the one or more blisters contain one or more liquid dosages having a temperature between about 90° C. and 110° C., without warping.

2. The packaging as claimed in claim 1, wherein the barrier film is formed from polymer selected from polychlorotrifluoroethylene, polyvinylidene chloride, cycloolefin polymer, or cycloolefin copolymer.

3. The packaging as claimed in claim 1, wherein the at least one polyurethane within one or more of the first and second adhesive layers is crosslinked with the epoxy crosslinker.

4. The packaging as claimed in claim 1, wherein the at least one polyurethane within one or more of the first and second adhesive layers is crosslinked with crosslinker comprising from 12.8 to 15% epoxy crosslinker, based on the weight of crosslinker solids/adhesive resin solids.

5. The packaging as claimed in claim 1, wherein the first and second adhesives have a coating weight ranging from 1.5 to 14 grams per square meter.

6. The packaging as claimed in claim 1, wherein the first and second adhesives have a coating weight ranging from 4.5 to 14 g/m'.

7. The packaging as claimed in claim 1, wherein the thermostable film has a glass transition temperature, $T_g$, of 90° C. to 140° C., as determined via differential scanning calorimetry at a scan rate of 20° C./min.

8. The packaging as claimed in claim 1, wherein the thermostable film has a glass transition temperature, $T_g$, of 105° C. to 120° C., as determined via differential scanning calorimetry at a scan rate of 20° C./min.

9. The packaging as claimed in claim 1, wherein the thermostable film comprises at least one of polyester, cyclic olefin copolymer, cyclic olefin polymer, or polyolefin, and wherein the thermostable film has a glass transition temperature, $T_g$, of 90° C. or higher, as determined via differential scanning calorimetry at a scan rate of 20° C./min.

10. The packaging as claimed in claim 1, wherein the thermostable film is a polyester comprising 2,2,4,4-tetramethyl-1,3-cyclobutanediol.

11. The packaging as claimed in claim 1, wherein the slip film comprises at least one of polyvinylchloride, polyvinylidene chloride, polyethylene terephthalate-1,4-cyclohexane 2 methyl ester ("PETG"), rubber modified nitrile polymer, polypropylene, or polystyrene.

12. The packaging as claimed in claim 1, wherein the thermostable film has a thickness ranging from about 200 microns to 1200 microns.

13. The packaging as claimed in claim 1, wherein the slip film has a total thickness ranging from about 4 microns to 120 microns.

14. The packaging as claimed in claim 1, wherein the barrier film has a thickness ranging from about 7 to 300 microns.

15. The packaging as claimed in claim 1, wherein the slip film is an uncoated polyvinylidene chloride (PVDC) film comprising a slip additive.

16. The packaging as claimed in claim 1, wherein the thermostable film comprises polyester.

17. The packaging as claimed in claim 1, wherein the laminate exhibits a moisture vapor transmission rate of about 0.04 g/m7/day to about 0.38 g/m²/day at 38° C., 90% RH.

18. The packaging as claimed in claim 1, wherein the one or more blisters contain one or more liquid dosages having a temperature of about 100° C.

19. The packaging as claimed in claim 1, wherein the one or more blisters were formed by deep drawing at a ratio of 1:1 to 6.5:1.

20. A method of making blister packaging according to claim 1, comprising:
   providing the thermostable film from a motor-driven or non-driven but braked winder;
   surface treating at least a first surface of the thermostable film;
   applying the first adhesive to the surface treated thermostable film;
   drying the adhesive coated thermostable film;
   surface treating a first surface of the barrier film;
   laminating the dried adhesive coated thermostable film to the first surface of the barrier film;
   surface treating a second surface of the barrier film in the thermostable-film/barrier-film intermediate laminate and a first surface of the slip film;
   applying the second adhesive to either the treated second-surface of the barrier film in the intermediate laminate or the treated first surface of the slip film;
   drying the second adhesive; and
   laminating the dried, second-adhesive-coated second surface of the barrier film layer of the intermediate laminate to the treated first surface of the slip film to form a three layered laminate.

21. The method as claimed in claim 20, further comprising curing the three layer laminate at about 23° C., 1 atm and 50% relative humidity, for at least 24 hours.

22. The method as claimed in claim 20, where the second adhesive is applied to the treated first surface of the slip film, resulting in higher interlaminar strength between the film layers.

* * * * *